Patented July 24, 1951

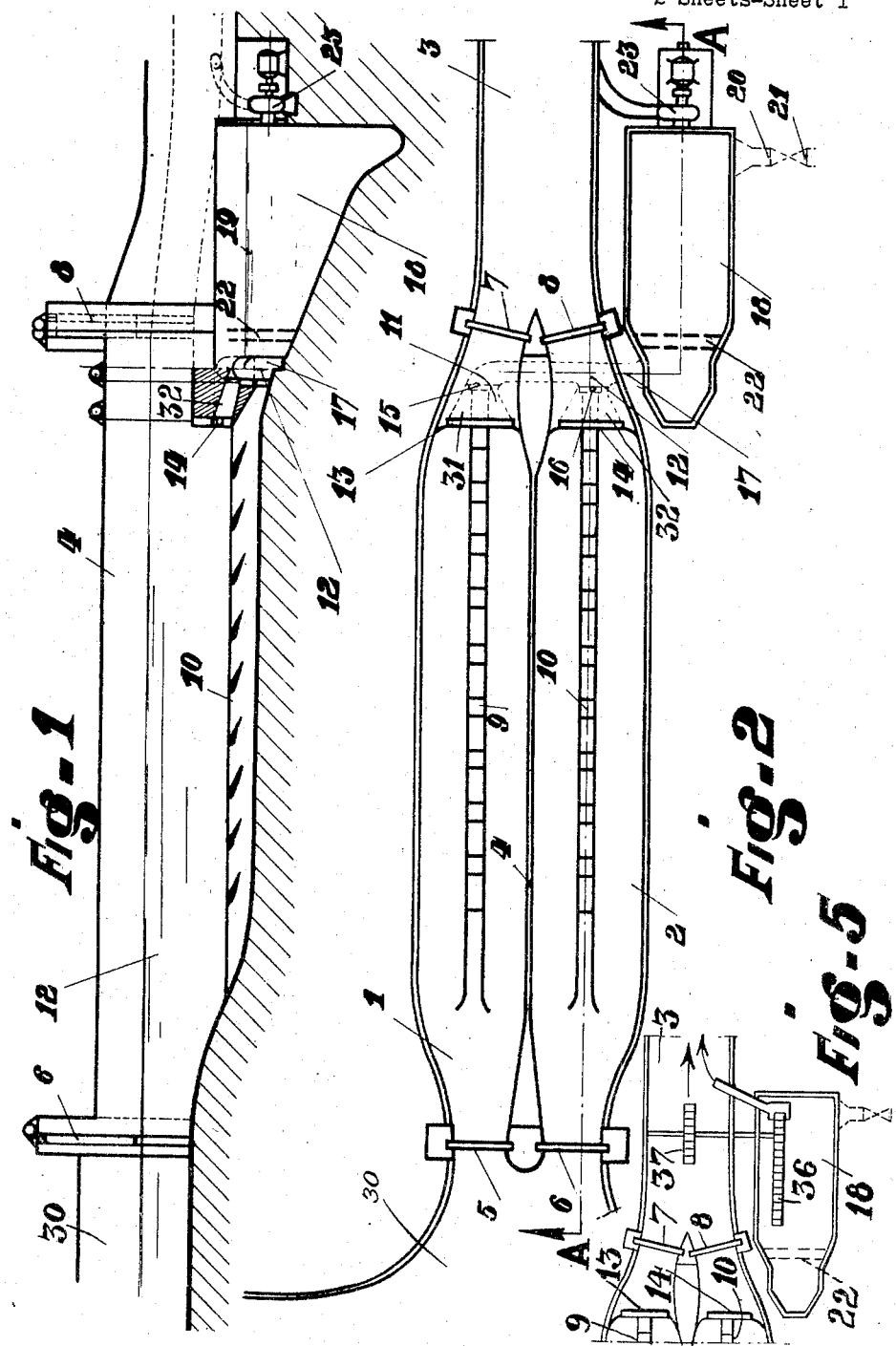

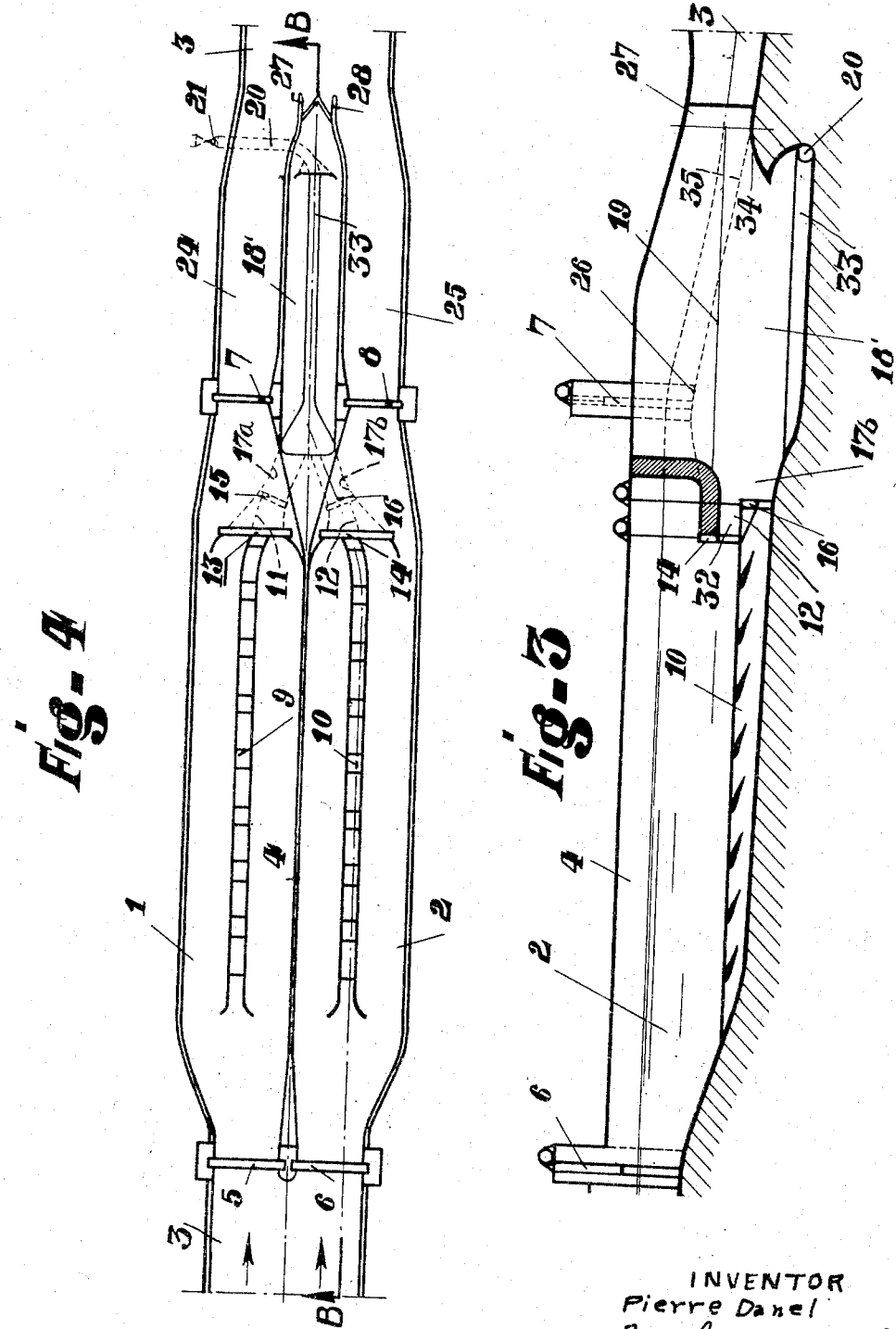

2,561,847

UNITED STATES PATENT OFFICE 2,561,847

SAND REMOVING INSTALLATION

Pierre Danel, Grenoble, France, assignor to Ateliers Neyret-Beylier & Piccard-Pictet, Grenoble, France, a corporation of France Application February 19, 1948, Serial No. 9,397
In France November 15, 1945

Section 1, Public Law 690, August 8, 1946
Patent expires November 15, 1965

13 Claims. (Cl. 210—52)

1

The present invention relates to an installation for removing sand, silt and similar materials from water being led from water courses, reservoirs and the like to hydraulic installations such as hydro-electric power stations, irrigation works, water supply systems for cities, industrial plants, etc.

It is known to provide sand-remover installations of various types whereby the sand-laden water is led from the reservoir or water course through a channel having a section of decreased gradient as compared with the upper and lower reaches thereof or which is widened for a portion of its length to decrease the flow velocity and permit the settling of the sand from the passing stream. The settled sand is removed by intermittently or continuously drawing off a portion of the water from adjacent the lower portion of the channel that has become more heavily laden with the settling sand. This results in the loss of a certain portion of the available output of water which heretofore, even under the most favorable conditions, has amounted to about one-tenth of the total flow.

The present invention has for an object to bring about the settling of the sand and its removal while at the same time recovering for useful applications and with a minimum loss of head a greater portion of the water which is removed with the sand.

Other objects and advantages of the invention will appear as the description proceeds.

According to the invention the sand-removing installation comprises a primary settling section of the main channel, which optionally may be divided into a plurality of parallelly-arranged channels, and which is provided with gates at the opposite ends for regulating the flow to a decreased velocity as compared with the entrance velocity so as to insure settling of the sand toward the bottom as the water passes therethrough. The clarified water is drawn off from the upper level of the passing stream and discharges to the downstream reach of the channel leading to the intake of the power station or to another point of useful disposal. The sand settling to the bottom of the primary sand remover or settler is discharged in a partial flow of heavily charged water to a separate secondary settling chamber where the water of the partial flow is allowed to become relatively quiescent with the result that the sand is substantially completely settled to the bottom of this second settling chamber or basin. The clarified portion of the water drawn off into this secondary settler

2 is returned to the main channel downstream from the primary settler. A minor portion of the originally heavily charged water drawn off into the second settler is utilized to flush out the sand collecting in the bottom of this settler. If desired and the volume of water being treated warrants such a step, the water used to evacuate the sand collecting at the bottom of the second settler may be passed to a third settling reservoir or basin where the decanting operation carried on in the second settler is repeated with a still further recovery of clarified water.

The invention will now be further described by reference to the accompanying drawings wherein:

Fig. 1 is an elevational view with parts in section on the line A—A of Fig. 2 of one embodiment of the invention;

Fig. 2 is a corresponding plan view;

Fig. 3 is an elevational view with parts in section taken on the line B—B of Fig. 4 and illustrating another embodiment of the invention; and Fig. 4 is a corresponding plan view;

Fig. 5 is a plan view of a modification of the embodiment of Figs. 1 and 2.

As shown in Figs. 1 and 2, a sand-remover of a known type constitutes the primary settling section of my device and is made up of a pair of parallelly-arranged settling or settlers 1 and 2 interposed in a channel 3 leading from the water reservoir 30 or another suitable source of water that is to be treated on its way to a point of utilization. The primary settlers 1 and 2 are separated by a dividing wall 4 and are respectively provided with inlet gates 5, 6 and outlet gates 7, 8 for controlling the flow to and from the respective primary settlers. The settlers 1 and 2 are respectively provided wih solid material collecting channels 9 and 10 which are respectively connected to a common discharge pipe 17 by passages 11 and 12 controlled by gates 15 and 16. Passages 31 and 32 controlled by gates 13 and 14 are also provided for directing a flow, if desired, directly from the respective settlers 1 and 2 at an intermediate level above the channels 9 and 10 to the common discharge pipe 17. Individual sand-removers having a structure similar to that above described are old in installations in which it has been customary to evacuate the settled solids in the form of a heavily loaded portion of the water through a discharge pipe to a suitable point of disposal.

According to the present invention, the pipe 17 leads to a decanting reservoir or secondary settler 18 so disposed as to insure that the free surface of the water contained therein will normally stand at a level 19 which is lower than the average level of the water in the primary settlers 1 and 2. As shown in Fig. 1, the bottom of the decanting reservoir 18 has a steep gradient to facilitate the flow of the collecting solids to and their passage through a draw-off pipe 20 provided with an adjustable control valve 21. As the output to be treated in the decanting reservoir is relatively small as compared with the total volume of water passed through the installation, the dimensions of the reservoir 18 may be relatively small in relation to the sand settlers 1 and 2.

The decantation in the secondary settler or reservoir 18 may be improved by interposing one or more rows of rods or pipes 22 or similar devices near the entrance of the reservoir for the purpose of suppressing turbulence and promoting calming of the water as it passes out into the body of the reservoir.

As previously indicated, the flow of water heavily charged with solids from the settlers 1 and 2 to the decanting reservoir 18 may be controlled so as to take place either continuously in a minor flow or intermittently. In either case, the water will remain within the reservoir 18 a sufficient length of time to prevent even the finest particles of sand or silt to settle down to the bottom, and when the system is properly operated, the portion of the water standing in the upper part of the reservoir adjacent to the lower end thereof will be satisfactorily clarified and may be withdrawn either continuously or intermittently and discharged into the channel 3 on the downstream side of the settlers 1 and 2. As shown in Figs. 1 and 2 a pump 23 is provided for the purpose. It will be understood, however, that various other means for lifting the clarified water from the reservoir 18 to the channel 3 may be provided. For example, considering the low output required, a simple bucket conveyor may be employed, as illustrated at 36 in Fig. 5, and the power for operating the same may be derived from the water flowing directly from the settlers 1 and 2 to the channel 3 by means of a water wheel 37 interposed in the channel.

The modification shown in Figs. 3 and 4 is generally similar to that of Figs. 1 and 2 insofar as the primary settlers are concerned, but departs therefrom in providing an arrangement whereby the water recovered from the smaller partial flow passing through the secondary decanting reservoir or settler 18' is led directly into the main current of clarified water passing through the downstream part of the channel 3 with a minimum loss of the available hydraulic head.

According to this modification, the decanting reservoir 18' is positioned centrally in the channel 3 immediately downstream from the primary settlers 1 and 2, thereby dividing this portion of the channel 3 into side channels 24 and 25. In this modification, the flow of heavily charged water from the collecting channels 19 is led through separate passages 17a and 17b to the decanting reservoir or settler 18'. The supplemental higher level passages 31 and 32, controlled by the gates 13 and 14, also lead directly into the secondary settler 18'. The secondary settler 18' is provided with a central collecting trough 33 and relatively steeply inclined side walls which facilitate the flow of the settling solids toward the collecting trough 33 whence they are withdrawn through a discharge pipe 20 under control of the valve 21. The clarified water output from the secondary settler 18' is discharged directly into the channel 3 by gravity.

As shown in Fig. 3, the disposition of the secondary settler 18' is such that the water level therein is normally maintained at a height which is approximately the same as the height of the water flowing through the side channels 24 and 25 at the points where the flow from these channels debouches into the main downstream portion of the channel 3. As in the case of the modification of Figs. 1 and 2, the average level of the water in the primary settlers 1 and 2 is kept substantially higher than the water level in the secondary settler 18'. The maintenance of the water level in the settlers 1 and 2 is facilitated by providing raised sills 26 beneath the control gates 7 and 8. The smooth outflow of the clarified water from the settler 18' into the flows from the side channels 24 and 25 at the point where they are reunited in the main channel 3 is assured by disposing the bottom 34 of the outlet passage 35 leading from the settler 18' at approximately the same level as the bottom of the channel 3 at the point of discharge from the passage 35 into such channel and controlling the velocity by suitably restricting the side walls of the settler adjacent the outlet and according to known hydraulic principles.

In order to isolate the secondary settler 18' from the channel 3 at will and to regulate the velocity of flow of the clarified water therefrom, control gates 27 and 28 mounted for movement about vertical axes are provided at the outlet end of this settler. These gates are preferably so disposed as to lie flush with the side walls of the settler 18' when they are in fully open position and to constitute smooth continuations thereof. Usually, they are so adjusted as to dimensions that they may meet at an acute angle when closed, thereby minimizing the opportunity for eddy currents in the flow from the side channels 24 and 25 into the main channel 3.

It will be understood that the provision of a plurality of primary settlers 1 and 2 with gate controls both at the upstream and downstream ends thereof, and also the provision of gates 13, 14, 15 and 16 leading therefrom to the secondary settler 18 or 18' insures a wide flexibility in the operation of the installation. For example, during low water periods when the amount of solids carried by the water is relatively small or nil, the partial flow from the lower portions of the primary settlers to the secondary settler may be closed off entirely or greatly reduced. Optionally, under such circumstances it may be more desirable to open the connections between the primary settlers and the secondary settler intermittently or periodically to flush out any accumulated sand from the bottoms of the primary settlers to the secondary settler. Similarly, it may be unnecessary to employ both of the primary settlers to handle the flow, and in this case only one of these elements need be kept in the circuit, or they may be operated alternately as desired. Conversely, during periods of high water or even when an average output is available, it may be more desirable to operate the primary settlers simultaneously with draw-off of settled solids to the secondary settler regulated to produce an optimum evacuation with the minimum amount of water required to serve the purpose.

It will be further understood that the invention makes possible the conservation of a high proportion of the available energy of the water. This is an important consideration when the water is destined for power generation. In this connection, it will be observed that the modification illustrated in Figs. 1 and 2 makes possible the recovery of a large proportion of the water heretofore lost in evacuating the solids without any necessary loss of energy whatsoever. This is made possible because the energy required to raise the clarified water from the secondary settler or decanting reservoir 18 to the downstream continuation of the open channel may be supplied by the primary flow of clarified water from the primary settlers which maintains the same head irrespective of the presence or absence of the second settler.

According to the embodiment of Figs. 3 and 4, the level of the water in the primary settlers is maintained somewhat higher than in the primary settlers in Figs. 1 and 2 and therefore at a higher head through use of the elevated sills 26 in conjunction with the gates 7 and 8. This makes it possible to maintain the surface level in the secondary settler at a higher point than would otherwise be the case, and, while there is a somewhat greater loss of head between the primary settler and the level maintained in the downstream continuation of the open channel, this loss is compensated by the increased recovery of water which is discharged through the secondary settler into the main downstream flow.

It will be understood that the invention is not restricted to the particular embodiment described and that it is not to be deemed as limited otherwise than as indicated by the language of the appended claims.

I claim:

1. An installation for removing sand from water being led in open channel flow to a hydraulic installation and increasing the proportion of water usable at such installation, comprising a primary sand-settler interposed in an open channel flow for promoting gravity separation of sand from water passing therethrough, a second sand settler in communication with said primary sand settler adjacent the bottom thereof and adapted to receive a flow of sand-laden water from the bottom portion of said primary settler, means for controlling discharge of de-sanded water from said primary settler directly to the adjacent downstream section of said channel, means for discharging sand settling to the bottom of said second settler, and means for returning water collecting in the upper portion of said second settler to said channel at the downstream side of said primary settler.

2. An installation for removing sand from water being led in open channel flow to a hydraulic installation and increasing the proportion of water usable at such installation, comprising a plurality of primary sand settlers interposed in parallel relation in an open channel flow for promoting gravity separation of sand from water passing therethrough, a secondary sand settler, conduits connecting said secondary settler to said primary settlers adjacent the bottoms thereof, means for controlling the flow of sand laden water through said conduits, means for controlling discharge of de-sanded water from said primary settlers to an adjacent downstream section of said channel, means for discharging sand settling to the bottom of said secondary settler, and means for returning water collecting in the upper portion of said secondary settler to said channel at the downstream side of said primary settlers.

3. A sand-removing installation according to claim 2 in which means is provided for selectively connecting said primary settlers with said secondary settler.

4. A sand-removing installation according to claim 2 in which means is provided for regulating the flow of water to said primary settlers independently of one another.

5. A sand-removing installation according to claim 2 in which said secondary settler is positioned adjacent the downstream ends of a pair of primary settlers and intermediate a pair of passageways connecting said primary settlers with said downstream channel, and which said secondary settler is provided with a spillway sill adjacent the lower end thereof lying in substantially the same plane as the bottom of the downstream channel and merging therewith.

6. A sand removing installation according to claim 5 in which means is provided for regulating the level of the flow from said primary settlers in correlation to the level of the flow from said secondary settler to said downstream channel.

7. In installation for removing sand from water being led in open channel flow to a hydraulic installation and increasing the proportion of water usable at such installation, comprising a pair of primary sand settlers interposed in parallel relation in an open channel flow for promoting gravity separation of sand from water passing therethrough, a secondary sand settler positioned intermediate said primary settlers at the downstream ends thereof, conduits connecting said secondary settler to said primary settlers adjacent the bottoms of said primary settlers, side channels connecting said primary settlers at the downstream ends thereof with a downstream continuation of the main channel, said secondary settler being provided with an overflow discharge channel at the lower end thereof in communication with said main channel and means for varying the width of said discharge channel and thereby regulating the velocity of the flow from said secondary settler to said main channel.

8. A sand-removing installation according to claim 7 in which said primary settlers are provided with raised sills at the downstream ends thereof and with gates cooperating therewith for regulating the flow of de-sanded water from said primary settlers to the downstream continuation of the main channel in correlation with the level of the flow from said secondary settler to said downstream channel.

9. Apparatus for removing sand from a flowing stream of water comprising a primary settling section receiving the entire flow of said stream, said primary settling section comprising at least one sand settler arranged to decrease the velocity of the water flowing therethrough and having at its downstream end an upper outlet for clear water and a lower outlet for mixed sand and water, a discharge channel receiving water from said upper outlet, and a secondary settling section receiving the flow of mixed sand and water from the lower outlet of said sand settler, said secondary settling section comprising a secondary sand settler having at its downstream end a lower outlet for mixed sand and water and an upper outlet for clear water, and means for conveying water from the upper outlet of said secondary settler to said discharge channel.

10. Apparatus for removing sand from water as defined in claim 9, in which the depth of said secondary settler increases in the downstream direction at a gradient substantially steeper than that of said one settler, and in which the lower outlet of the secondary settler communicates with the lowest point therein.

11. Apparatus for removing sand from water as defined in claim 9, including baffles in said secondary settler near the inlet end thereof to suppress turbulence therein.

12. Apparatus for removing sand from water as defined in claim 9, including a supplementary outlet passage leading from said one settler to said secondary settler for supplying clear water thereto.

13. Apparatus for removing sand from water as defined in claim 9, in which said outlet channel is at a higher level than the upper outlet of said secondary settler, said means for conveying water from the upper outlet of said second settler includes means for lifting the water to said higher level, and means for operating the water lifting means by power derived from the stream flowing through said outlet channel.

PIERRE DANEL.

REFERENCES CITED

The following references are of record in the file of this patent:

UNITED STATES PATENTS

| Number | Name | Date |
| --- | --- | --- |
| 783,196 | Hatschek | Feb. 21, 1905 |
| 1,069,040 | Steuer | July 29, 1913 |
| 1,337,279 | Sensibar | Apr. 20, 1920 |
| 1,431,367 | Buchi | Oct. 10, 1922 |

FOREIGN PATENTS

| Number | Country | Date |
| --- | --- | --- |
| 103,670 | Great Britain | Jan. 24, 1918 |
| 107,121 | Great Britain | June 21, 1917 |
| 107,326 | Austria | Sept. 26, 1927 |
| 487,155 | France | Mar. 18, 1920 |
| 47,217 | Germany | June 6, 1889 |

Certificate of Correction

Patent No. 2,561,847                              July 24, 1951

PIERRE DANEL

It is hereby certified that error appears in the printed specification of the above numbered patent requiring correction as follows:

Column 2, line 29, before "or" insert *cells*; line 38, for "wih" read *with*; and that the said Letters Patent should be read as corrected above, so that the same may conform to the record of the case in the Patent Office.

Signed and sealed this 29th day of January, A. D. 1952.

[SEAL]

THOMAS F. MURPHY,
*Assistant Commissioner of Patents.*